United States Patent

[11] 3,582,063

| [72] | Inventors | Oliver W. Gnage;<br>Norman N. Lareau, both of Rochester, N.Y. |
|---|---|---|
| [21] | Appl. No. | 794,313 |
| [22] | Filed | Jan. 27, 1969 |
| [45] | Patented | June 1, 1971 |
| [73] | Assignee | Eastman Kodak Company<br>Rochester, N.Y. |

[54] FILM SHEET POSITIONING MECHANISM FOR CASSETTES AND METHOD OF USE
15 Claims, 4 Drawing Figs.

[52] U.S. Cl. .................................................. 271/5,
271/59
[51] Int. Cl. ..................................................... B65h 5/10
[50] Field of Search ......................................... 271/5, 11,
14, 15, 10, 4, 87, 89, 59

[56] References Cited
UNITED STATES PATENTS

| 1,448,301 | 3/1923 | Hotchkiss.................... | 271/89 |
| 2,413,554 | 12/1946 | Evers.......................... | 271/5X |

*Primary Examiner*—Joseph Wegbreit
*Attorneys*—Robert W. Hampton and Milton S. Sales ABSTRACT: A film sheet pickup mechanism includes a telescopic tube having vacuum supplied cups for engaging a film sheet supplied from a magazine. The pickup mechanism moves the film sheet towards an open cassette with the vertical centerline of the sheet laterally displaced from that of the cassette and the horizontal centerline of the film sheet higher than the corresponding centerline of the cassette. After the sheet has partially entered the cassette, a cam and follower mechanism moves the sheet into lateral alignment with the cassette, the sheet dropping to the bottom of the cassette when the vacuum supply to the cups is removed.

OLIVER W. GNAGE
NORMAN N. LAREAU
INVENTORS

BY *Milton S. Sales*

*Robert W. Hampton*
ATTORNEYS

PATENTED JUN 1 1971

OLIVER W. GNAGE
NORMAN N. LAREAU
INVENTORS

BY *Milton S. Sales*

*Robert W. Hampton*

ATTORNEYS

FILM SHEET POSITIONING MECHANISM FOR CASSETTES AND METHOD OF USE

CROSS-REFERENCES TO RELATED APPLICATIONS

Reference is made to commonly assigned copending U.S. Pat. Applications Ser. No. 625,829, entitled X-RAY CASSETTE, filed Mar. 24, 1967 in the name of Fredrick F. Tone Ser. No. 794,031, entitled AN AUTOMATIC DISPENSER AND STORAGE DEVICE FOR SHEET FILM, filed concurrently in the names of Stephen J. Wenthe and Charles F. Shute; and Ser. No. 794,032, entitled AN AUTOMATIC CASSETTE LOADER AND UNLOADER FOR SHEET FILM, filed concurrently in the names of Patricia M. Andrus and Charles J. Kunz.

BACKGROUND OF THE INVENTION

This invention relates to automatic cassette loading and unloading machines, and more particularly to a device for such machines to position a sheet of unexposed film in a cassette during the loading step.

Before the advent of automatic loading and unloading machines, cassettes containing exposed film were passed into a darkroom through a lighttight slit. An operator in the darkroom would manually open the cassette, remove the exposed film and feed it into a processor. The operator would then remove a similar sheet of unexposed film from a storage area, insert it into the cassette and pass the loaded cassette out of the darkroom.

When the above process is carried out automatically by an automatic unloading and loading machine such as shown in copending U.S. Pat. Application Ser. No. 794,032, entitled AN AUTOMATIC CASSETTE LOADER AND UNLOADER FOR SHEET FILM, filed concurrently in the names of Patricia M. Andrus and Charles J. Kunz, a special cassette similar to that shown in commonly assigned copending U.S. Application Ser. No. 625,829, entitled X-RAY CASSETTE, filed in the name of Fredrick F. Tone on Mar. 24, 1967 is inserted into a film unloading and loading machine. The machine opens the cassette, removes the exposed sheet of film and carries it to the processor, withdraws a fresh sheet of film from a cartridge and loads it into the cassette, and finally closes the cassette and ejects it.

An example of an automatic machine of this type is shown in commonly assigned copending U.S. Application Ser. No. 794,032, entitled AN AUTOMATIC CASSETTE LOADER AND UNLOADER FOR SHEET FILM, filed concurrently in the names of Patricia M. Andrus and Charles J. Kunz. Since the cassettes are designed to hold sheets of film which closely fit into recesses in the cassettes' bases, the sheets being loaded therein must be properly aligned with the cassettes. Therefore, the film cartridge must be carried in the machines in a position accurately aligned with the cassette to within close manufacturing tolerances. The alignment problems are further complicated when the machine is equipped to accept several sizes of cassettes and has a film magazine with at least an equal number of film cartridges since each cartridge of the magazine must be accurately aligned with the cassette holding brackets for the associated sized cassette.

SUMMARY OF THE INVENTION

It is an object of the present invention to provide an improved device for aligning a piece of sheet material in a tray. Another object is to provide an improved method for aligning a piece of sheet material in a tray.

In accordance with a preferred embodiment of the invention, a film pickup mechanism having provision for grasping a sheet of film in a cartridge is mounted on a film transport mechanism having freedom of movement in two directions within a single plane. The pickup mechanism itself provides an additional degree of freedom for movement in a direction substantially perpendicular to that plane. The film is transported to a cassette with its vertical and horizontal center lines slightly offset form the corresponding center lines of the cassette. Upon entering the cassette, the film is caused to move laterally until its leading edge abuts the edge of the film-receiving recess of the cassette. At this time, the film is laterally aligned in the cassette. The pickup mechanism then releases the film which drops to the bottom of the cassette recess, completing the alignment process.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawing, in which.

DESCRIPTION OF THE PREFERRED EMBODIMENT

The System

Figure 1:
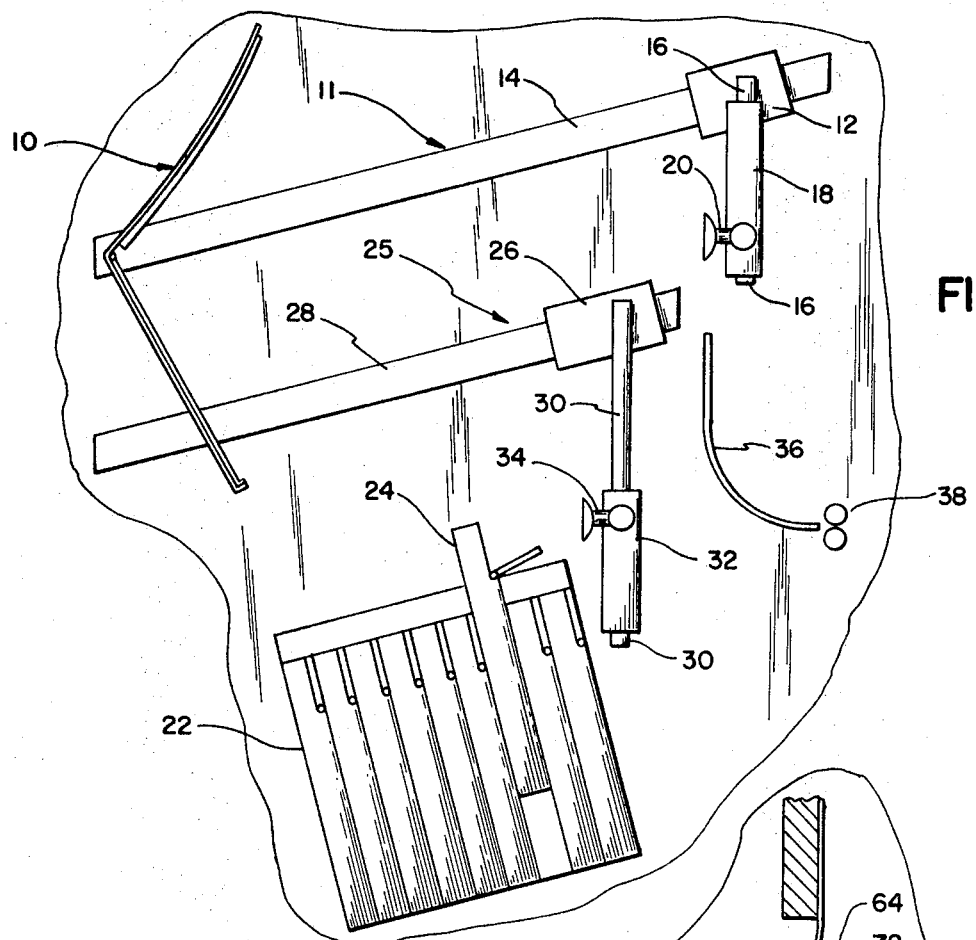
FIG. 1 is a segmental schematic view showing the operation of the automatic cassette loading and unloading machine.

FIG. 1 shows in somewhat schematic form a machine for removing a sheet of exposed film from a cassette 10, delivering that sheet to an automatic processing machine and finally reloading the cassette with unexposed film, all of these steps being carried out in a lighttight enclosures, not shown. The device is intended for X-ray film cassettes but may of course be used with other types of film. A film transport mechanism 11 for unloading the exposed film from cassette 10 consists of a carriage 12 slidable along a channel 14 and carrying a vertically disposed channel 16. A carriage 18 is slidably mounted on channel 16 and carries a film pickup mechanism 20 which is pivotably mounted on carriage 18.

A supply of unexposed film is kept in a magazine 22 having a number of cartridges, one of which is shown in an extended and open position and is indicated by reference numeral 24. Each cartridge contains a different size or type X-ray film and is selectively raised to provide fresh film corresponding to the type of film removed from the cassette. For this purpose, the machine may be responsive to a code on the cassette to automatically raise the correct cartridge. This apparatus is more fully explained in commonly assigned, copending U.S. Application Ser. No. 794,031, entitled AN AUTOMATIC DISPENSER AND STORAGE DEVICE FOR SHEET FILM, filed concurrently in the names of Stephen J. Wenthe and Charles F. Shute.

The mechanism for withdrawing a fresh sheet of film from magazine 22 and loading it into now empty cassette 10 consists of a film transport mechanism 25 including a carriage 26 slidable along a channel 28 and carrying a vertically disposed channel 30. A carriage 32 is slidably mounted on channel 30 and carries a second film pickup mechanism 34 which is pivotally mounted on carriage 32. The unloading and loading machine may have only one film transport mechanism and pickup mechanism which performs both unloading and loading functions.

System Operation

When cassette 10 containing an exposed sheet of X-ray film is slid into the machine, its presence automatically triggers the following sequence of events. The cassette is opened, and film pickup mechanism 20 is moved towards the cassette and pivoted into the plane of the film. Having grasped the film, preferably by vacuum, pickup mechanism 20 carries it to the opposite end of the machine where it is released above a ramp 36. The ramp guides the film through feed rollers 38 into an automatic processor, not shown.

To reload cassette 10, one of the cartridges in film magazine 22 is raised and opened. Pickup mechanism 34 is moved towards the open cartridge and pivoted into the plane of the film. Having grasped the film, pickup mechanism 34 returns to a vertical position, this causing any other sheets which might be carried along with the first to drop off and return to the cartridge. Pickup mechanism 34 is then raised along channel 30 and slid along channel 28 until it is in position to release the film sheet into cassette 10. The cassette is then closed and ejected from the machine to complete the operation.

While the above description is rather brief, it is intended only as background information for a better understanding of the detailed description to follow. A more detailed description of the operation can be found in above-mentioned Application Ser. No. 794,031.

Sheet Positioning Device

Figure 2:
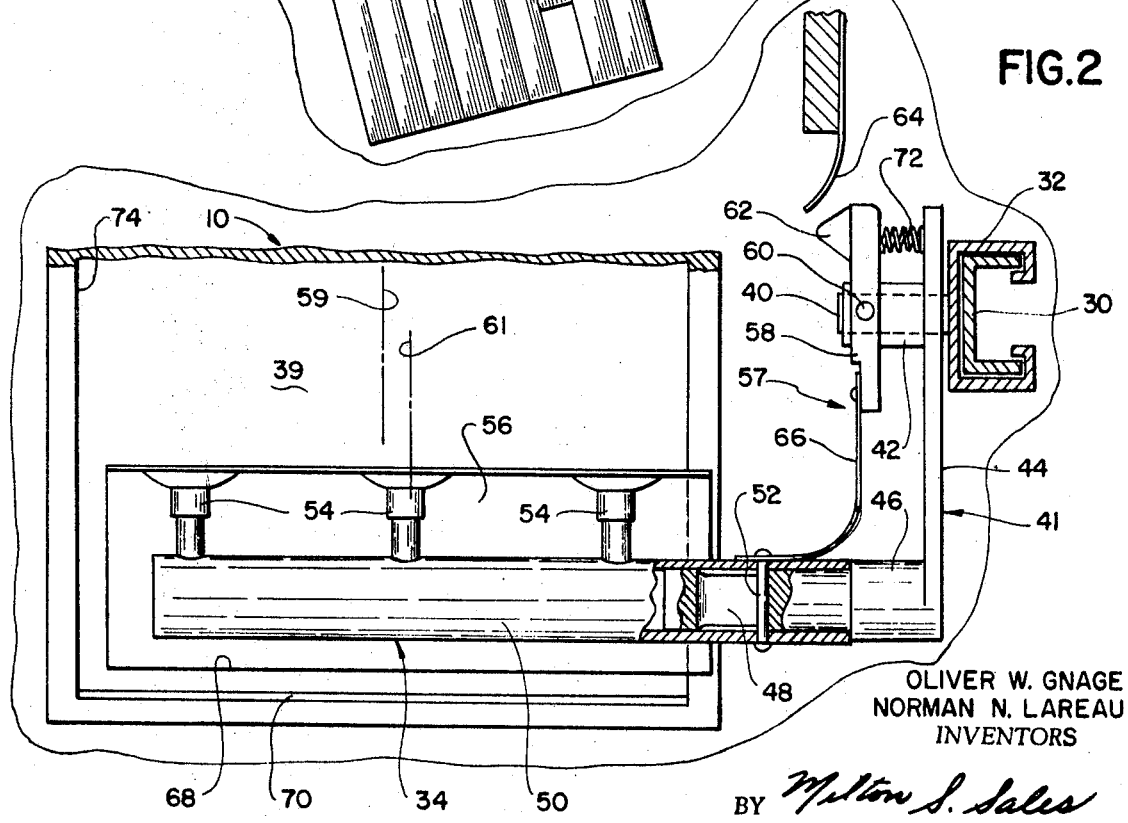
FIG. 2 is a segmental plan view of the pickup mechanism and cassette.
Figure 3:
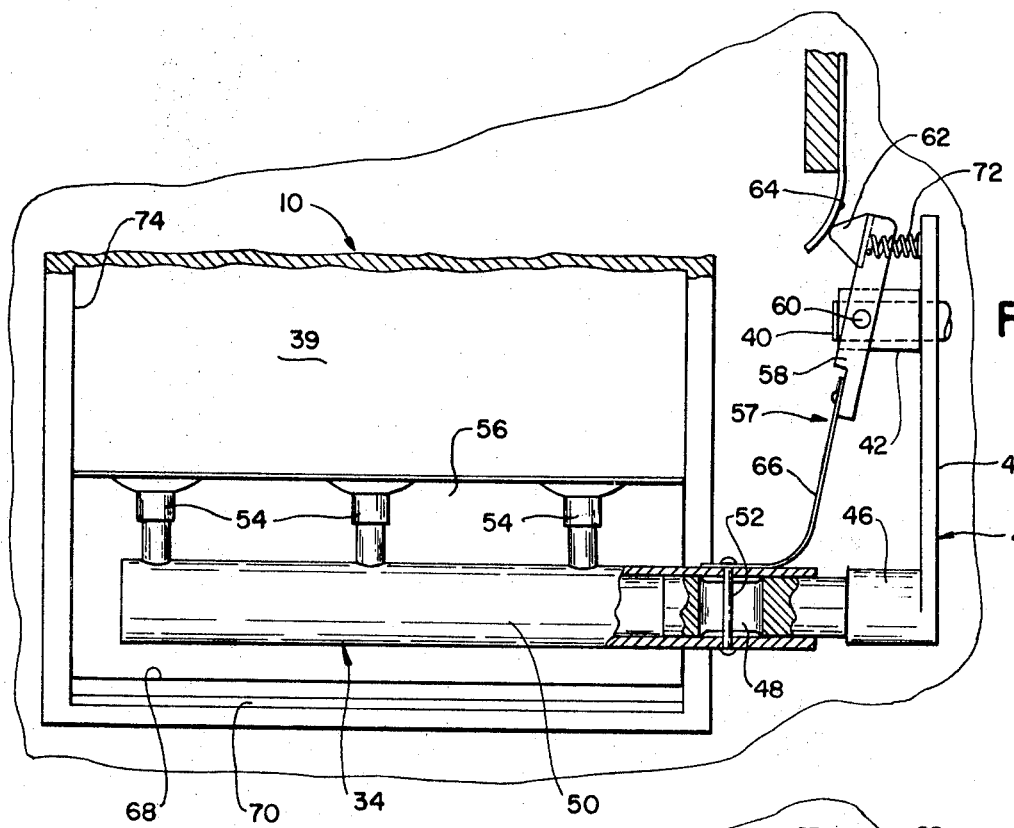
FIG. 3 is a plan view similar to FIG. 2 with the pickup mechanism in another position.
Figure 4:
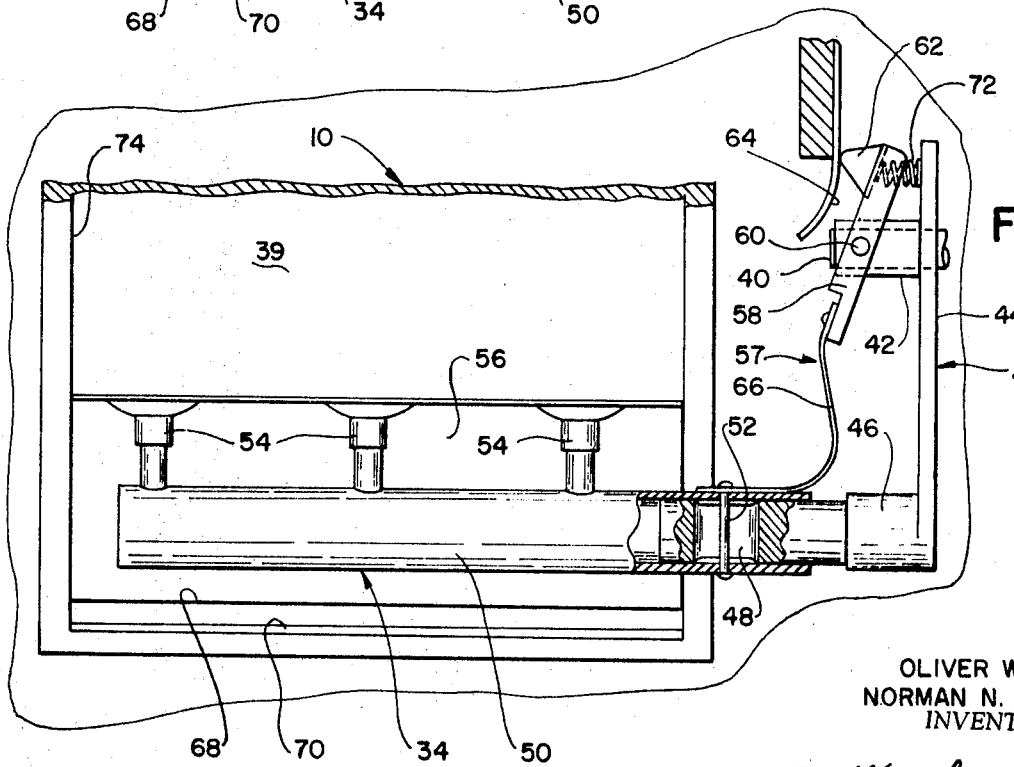
FIG. 4 is a plan view similar to FIGS. 2 and 3 with the pickup mechanism in still another position.

As can be readily understood, it is important for the operation of the above-described system, particularly the loading of the cassette with unexposed film, that the unexposed film taken from magazine 22 be properly aligned with cassette 10. Because different sizes of cassettes and film may be used in the system, lateral errors in the location of sheets of film in the cartridges occur, and manufacturing tolerances between the cartridges and cassettes exist, it is difficult to accurately position the cassettes relative to magazine 22 so that proper loading of the cassette may occur repetitively and reliably. FIGS. 2—4 show a preferred embodiment of a sheet film positioning device according to the present invention for laterally locating the unexposed film in a recess or tray 39 in cassette 10.

Carriage 32 carries a shaft 40 on which an arm assembly 41 including a bearing member 42 is pivotally mounted. A pickup arm 44 extends from bearing member 42 and carries a shaft 46 extending parallel to shaft 40 and having an elongated hole 48. Pickup mechanism 34 including a tube 50 is slidably mounted on shaft 46 and carries a push pin 52 which extends through elongated hole 48. A number of vacuum cups 54 are provided on pickup tube 50 for grasping a sheet 56 of X-ray film. Means (not shown) are provided for selectively supplying vacuum to cups 54.

A pusher mechanism 57 operatively connects arm assembly 41 and pickup mechanism 34. Pusher mechanism 57 includes a bracket 58 which is pivotally mounted on bearing member 42 at 60 and carries a cam button 62 which cooperates with a cam plate 64 fixed to the machine near the position of cassette 10. A flat spring 66 is attached at one end to pusher bracket 58 and at the other end to pusher pin 52.

Operation of the Sheet Positioning Device

When it is desired to reload cassette 10 with a sheet of unexposed X-ray film, pickup mechanism 34 is positioned adjacent open film cartridge 24. Pickup arm 44 is rotated about shaft 40 until suction cups 54 are in the same plane as the sheet of film. At this time, pickup tube 50 is in its telescoped position as shown in FIG. 2. After vacuum is applied to suction cups 54, arm 44 is rotated about shaft 40 to its original position to permit any sheets which have adhered to sheet 56 to drop therefrom, and pickup mechanism 34 is then raised to withdraw the sheet from the cartridge.

Carriage 32 is elevated along channel 30 until film sheet 56 is aligned with open cassette 10. At the same time, carriage 26 is transported along channel 28. As can be seen in FIG. 2, the vertical center line 59 of cassette 10 is slightly disposed to the left of the center line 61 of film 56 and the bottom edge 68 of the film is higher than the corresponding supporting surface 70 of film-receiving recess 39. The lower portion of the film enters the recess in cassette 10 in this manner.

Referring now to FIG. 3, as pickup mechanism 34 continues to move towards cassette 10, cam button 62 engages and begins to ride up cam plate 64. This causes bracket 58 to rotate in a clockwise direction about pivot 60 against the force of a return spring 72. Flat spring 66 transmits this movement through pin 52 to pickup tube 50 and film sheet 56, causing the film sheet to move leftwardly. This movement is continued until the left edge of sheet 56 abuts the cooperating surface 74 of recess 39. As pickup mechanism 34 continues to move towards cassette 10 as shown in FIG. 4, pickup tube 50 and film 56 are prevented from moving further to the left by virtue of the sheet edge abutting surface 74, and the additional movement of bracket 58 is taken-up by the compliance of pusher spring 66.

After film 56 has been laterally located in recess 39, the vacuum to suction cups 54 is automatically removed. The film is now released and is permitted to drop in the cassette until its bottom edge 68 abuts the cooperating surface 70 of the cassette. Pickup mechanism 34 is returned to its original position, and the cassette may now be closed and removed.

The invention has been described in detail with particular reference to preferred embodiments thereof, but it will be understood that variations and modifications can be effected within the spirit and scope of the invention as described hereinabove and as defined in the appended claims.

We claim:

1. Apparatus for transporting a piece of sheet material having a side edge from a supply of said sheet material to a container having an upstanding abutment on at least one lateral edge and for laterally aligning said piece of sheet material with said container, said apparatus comprising:
   a. means for moving said sheet material from said supply to a position in said container spaced laterally from said abutment; and
   b. means for moving said moving means to effect lateral movement of said sheet material in said container towards said abutment until said side edge engages said upstanding abutment.

2. Apparatus for transporting a piece of sheet material having a side edge from a supply of said sheet material to a container having an upstanding abutment on at least one lateral edge and for laterally aligning said piece of sheet material with said container, said apparatus comprising:
   a. means for moving said sheet material from said supply to a position in said container spaced laterally from said abutment, wherein said means for moving said sheet material from said supply to said container comprises:
      1. a sheet pickup mechanism,
      2. means on said pickup mechanism for grasping said sheet of film, and
      3. a transport mechanism connecting to said pickup mechanism for moving said pickup mechanism to a position in which said sheet lies at least partially in said container with said side edge spaced laterally from said side surface; and
   b. means operatively connected to said moving means for moving said sheet material laterally in said container towards said abutment until said side edge engages said upstanding abutment.

3. Apparatus as defined in claim 2 wherein said means for moving said sheet material laterally comprises means for moving said sheet pickup mechanism laterally with respect to said transport mechanism.

4. Apparatus for laterally aligning a sheet of unexposed film having a vertical side edge with a film-receiving recess of a cassette prior to loading the cassette with said sheet of film, the recess having a side surface corresponding to said side edge of the film sheet, comprising:
   a. a movable film pickup mechanism;
   b. means on said film pickup mechanism for grasping said sheet of film;
   c. transport means connected to said film pickup mechanism for moving said film pickup mechanism to a position in which said film lies at least partially in said cassette film-receiving recess with said vertical side edge in alignment with and spaced laterally from said side surface; and
   d. pusher means connected to said film pickup mechanism for moving said film pickup mechanism laterally until said vertical side edge abuts said side surface, whereby said sheet of film is laterally aligned with the cassette.

5. Apparatus as defined in claim 4 wherein said pusher means includes a lost motion device whereby said pusher means may continue to move after said vertical side edge abuts said side surface, the additional movement of said pusher means being taken up by said lost motion device.

6. Apparatus as defined in claim 5 wherein said lost motion device comprises a resilient spring.

7. Apparatus as defined in claim 4 wherein said pusher mechanism comprises:
   a. a bracket having a normal first position and movable to a second position as said pickup mechanism approaches said cassette; and
   b. means operatively connecting said bracket and said pickup mechanism so that movement of said bracket from its first to its second position moves said pickup mechanism laterally to cause said film side edge to abut said side surface of the film-receiving recess, and so that additional movement of said bracket after said vertical side edge abuts said side surface is permitted without movement of said pickup mechanism.

8. Apparatus as defined in claim 7 wherein said means operatively connecting said bracket and said pickup mechanism comprises a resilient member which absorbs the additional movement of said bracket after said vertical edge abuts said side surface.

9. Apparatus as defined in claim 4 further including a cam plate fixed in a position adjacent said cassette and wherein:
   a. said pickup mechanism is telescopically mounted on said transport means and extensible in a direction transverse of said cassette to move said film side edge towards said recess side surface; and
   b. said pusher means includes
      1. a bracket movably mounted on said transport means,
      2. a resilient member operatively connecting said bracket and said pickup mechanism so that movement of said bracket is transmitted to said pickup mechanism to telescopically extend it until said film side edge abuts said recess side surface, thereafter additional movement of said bracket being taken up by said resilient mechanism,
      3. a spring resiliently urging said bracket in a direction telescoping said pickup mechanism, and
      4. a cam button on said bracket for cooperating with said cam plate as said transport means moves said pickup mechanism towards said cassette to move said bracket against the force of said spring.

10. Apparatus as defined in claim 4 wherein:
    a. said sheet of film has a bottom edge;
    b. said film-receiving recess has a bottom surface corresponding to said bottom edge;
    c. said bottom edge is spaced above said bottom surface when the said pickup mechanism is in said position; and
    d. said grasping means releases said sheet after said pusher means has moved said pickup member laterally, whereby the sheet falls in said recess until said bottom edge abuts said bottom surface.

11. Apparatus for withdrawing a sheet of unexposed film having a vertical side edge from a film magazine and laterally aligning it in a film-receiving recess of a cassette, the recess having a side surface corresponding to said vertical side edge, comprising:
    a. a movable pickup mechanism;
    b. means on said pickup mechanism for grasping said sheet of film;
    c. a first position for said pickup mechanism adjacent said magazine wherein said means may grasp said sheet of film in the magazine;
    d. a second position for said pickup mechanism adjacent said cassette recess wherein said vertical side edge is spaced laterally of said corresponding side surface;
    e. a third position for said pickup mechanism adjacent said cassette recess wherein said vertical side edge abuts said corresponding side surface;
    f. transport means connected to said pickup mechanism for moving said pickup mechanism from said first to said second positions; and
    g. pusher means connected to said pickup mechanism for moving said pickup mechanism from said second to said third positions, whereby sheet of film is aligned with the cassette.

12. Apparatus as defined in claim 11 wherein:
    a. said sheet of film has a bottom edge;
    b. said film-receiving recess has a bottom surface corresponding to said bottom edge;
    c. said bottom edge is spaced above said bottom surface when said pickup mechanism is in second position; and
    d. said grasping means releases said sheet after said pickup mechanism has been moved to said third position, whereby the sheet falls in said recess until said bottom edge abuts said bottom surface.

13. A method of withdrawing a sheet of unexposed film having a vertical side edge from a film magazine and depositing it in a film-receiving recess of a cassette, the recess having a side surface corresponding to said side edge of the film sheet comprising the steps of:
    a. grasping said film sheet in said magazine;
    b. withdrawing said film sheet from said magazine;
    c. positioning said film sheet at least partially in said film-receiving recess with said edge of the sheet being spaced laterally from said side surface;
    d. moving said film sheet laterally in said recess until said edge of the sheet abuts said side surface; and
    e. releasing said film sheet.

14. A method of withdrawing a sheet of unexposed X-ray film having a vertical side edge and a horizontal bottom edge from a film magazine and depositing it in a film-receiving recess of a cassette, the recess having side and bottom surfaces corresponding to said side and bottom edges comprising the steps of:
    a. grasping said film sheet in said magazine;
    b. withdrawing said film sheet from said magazine;
    c. positioning said film sheet at least partially in said film-receiving recess with said side edge of the film sheet being spaced laterally and said bottom edge of the film sheet being spaced above said corresponding side and bottom surfaces of said recess, respectively;
    d. moving said film sheet laterally in said recess until said side edge of the film sheet abuts said side surface of the recess; and
    e. releasing said film sheet whereby it will drop in the recess until its bottom edge abuts said bottom surface of the recess.

15. Apparatus for transporting a piece of sheet material having a side edge from a supply of said sheet material to a container having an upstanding abutment on at least one lateral edge and for laterally aligning said piece of sheet material with said container, said apparatus comprising:
    a. means for automatically moving said sheet material from said supply to a position in said container spaced laterally from said abutment; and
    b. means for automatically moving said moving means to effect lateral movement of said sheet material in said container towards said abutment until said side edge engages said upstanding abutment.